United States Patent [19]

Mrowka

[11] Patent Number: 4,667,268
[45] Date of Patent: May 19, 1987

[54] MOLDED CASE ELECTRIC CIRCUIT BREAKER MOUNTING ASSEMBLY

[75] Inventor: Joseph J. Mrowka, Bristol, Conn.
[73] Assignee: General Electric Company, New York, N.Y.
[21] Appl. No.: 791,624
[22] Filed: Oct. 25, 1985
[51] Int. Cl.⁴ .............................................. H02B 1/04
[52] U.S. Cl. ................................ 361/353; 174/138 F; 361/355; 361/363; 361/376
[58] Field of Search .................... 174/138 F; 200/294, 200/296; 339/22 B, 198 N, 198 J; 361/341, 346, 353–356, 358–359, 361, 363, 376

[56] References Cited

U.S. PATENT DOCUMENTS

| | | | |
|---|---|---|---|
| 3,858,092 | 12/1974 | Olashaw et al. | 361/346 |
| 3,924,161 | 12/1975 | Olashaw et al. | 361/341 |
| 4,153,318 | 5/1979 | Bishop et al. | 361/355 |
| 4,167,768 | 9/1979 | Baker et al. | 361/353 |
| 4,251,851 | 2/1981 | Diersing et al. | 361/361 |

Primary Examiner—Roy N. Envall, Jr.
Assistant Examiner—Gregory D. Thompson
Attorney, Agent, or Firm—Richard A. Menelly; Walter C. Bernkopf; Fred Jacob

[57] ABSTRACT

A molded plastic circuit breaker support for lighting panel boards includes integral guides for robotic insertion of the branch strap conductors as well as integral support means for providing additional support to the main bus conductors. A former plastic cover is positioned over the branch strap conductors for electrical isolation within the panel board enclosure and a formed plastic phase barrier shield is attached to the top of the support for insulating the main bus conductors.

10 Claims, 6 Drawing Figures

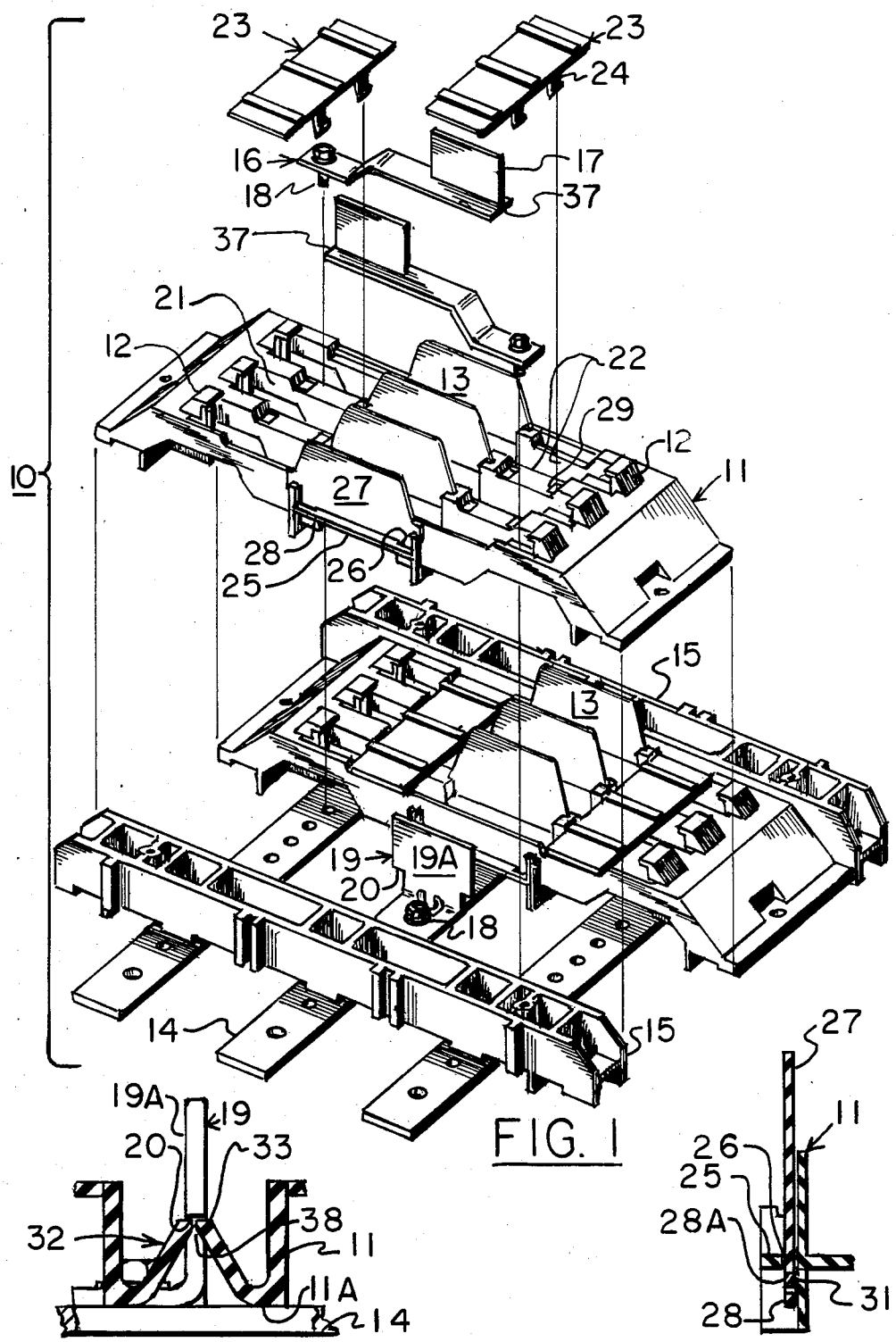

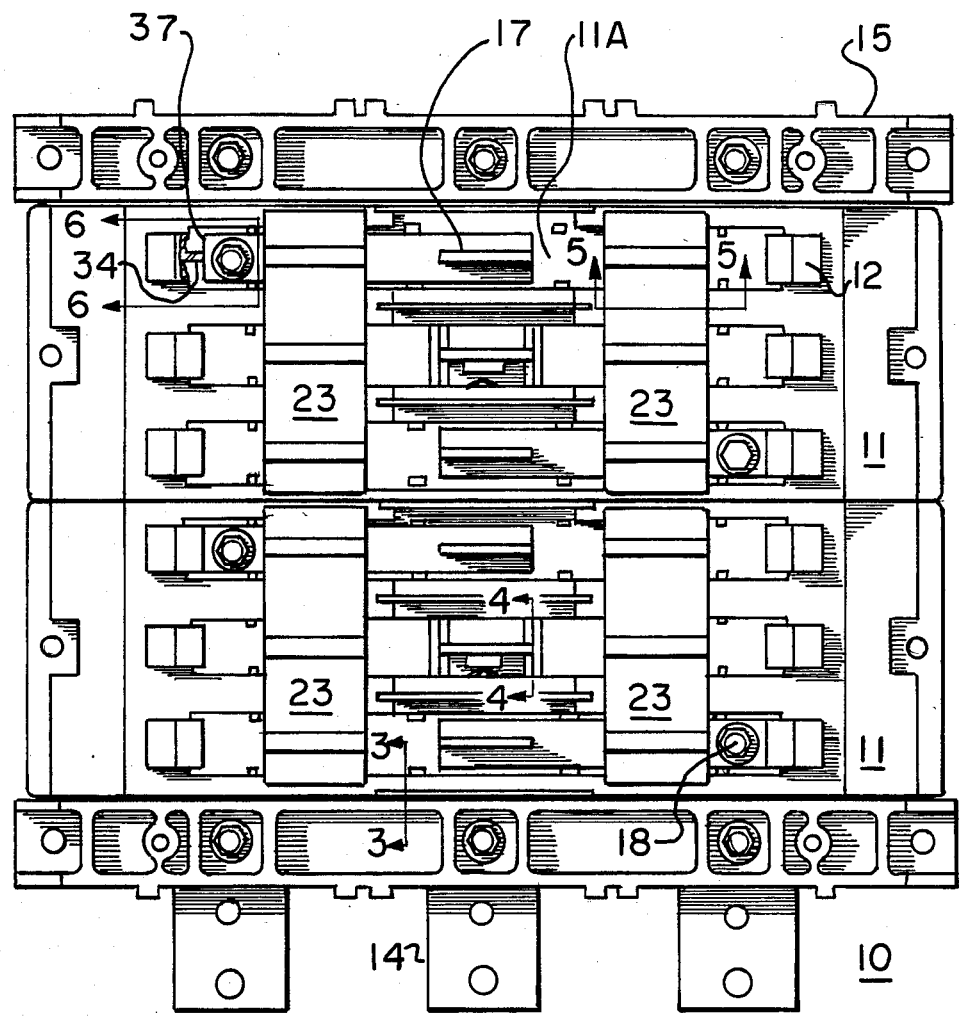
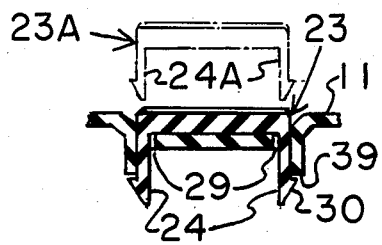
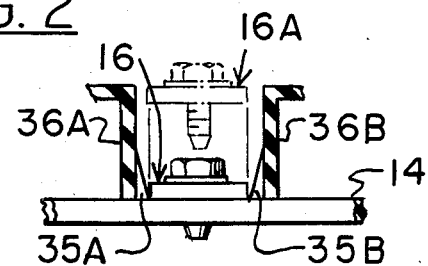

MOLDED CASE ELECTRIC CIRCUIT BREAKER MOUNTING ASSEMBLY

BACKGROUND OF THE INVENTION

U.S. patent application Ser. No. 705,454 filed Feb. 25, 1985, entitled "Lighting Circuit Breaker Panel Modular Assembly" describes a lighting panel board designed for fully automated assembly. The panel board basically consists of an array of main circuit breaker bus conductors, hereafter "main busses" and a cross-array of branch circuit breaker strap conductors, hereafter "branch straps" supported on a plastic circuit breaker mounting assembly electrically interconnected with the main and branch circuit breakers. To provide adequate electrical insulation between the mounted circuit breakers and the branch straps, the top surface of the circuit breaker plastic mounting assembly is mostly closed along the top surface. When the branch straps are down-loaded within the circuit breaker mounting assembly, the small opening within the top surface for receiving the branch straps requires that they be angularly loaded with respect to the horizontal plane. The angular loading requirement reduces the speed at which the branch straps can be robotically assembled. Because of the limited access for manipulating the branch straps within the restricted opening, some additional time is involved for properly positioning due to the "blind loading" of the branch straps within the interior of the covered circuit breaker mounting assembly.

When a plurality of main busses are attached to the bottom of the circuit breaker mounting assembly, the main busses flex somewhat during the assembly process. This is presumably caused by the insufficient thickness of the main busses with respect to their long linear extent along the bottom of the circuit breaker mounting assembly. The flexing of the attached main busses could cause inaccuracies as to their exact location when the circuit breaker assembly with the branch straps and main busses attached is connected within the lighting panel board enclosure.

One purpose of this invention is to provide a circuit breaker mounting assembly with direct access to the branch strap supporting structure within the interior of the circuit breaker mounting support as well as with direct access to guides integrally formed therein for facilitating placement of the straps during robotic assembly. A further purpose of the invention is to provide structural support to the busses attached to the bottom of the circuit breaker mounting support by means of integrally formed bus support clips.

SUMMARY OF THE INVENTION

The invention comprises a molded plastic circuit breaker mounting support for lighting panel board assemblies wherein the molded circuit breaker support provides access means for locating the branch straps along with means for electrically insulating the branch straps within the lighting panel board enclosure. Integrally formed guide rails on the bottom sides of the circuit breaker mounting support guide the branch straps to an exact location within the circuit breaker mounting support. Slotted support clips integrally formed within the bottom of the circuit breaker mounting support receive the circuit breaker stabs fixedly attached to the main busses and rigidly hold them against the bottom of the circuit breaker mounting support to provide further support to the main busses.

BRIEF DESCRIPTION OF THE DRAWINGS

FIG. 1 is a top perspective view in isometric protection of the circuit breaker mounting support assembly according to the invention;

FIG. 2 is a plan view of a completely assembled lighting panel board assembly according to the invention;

FIG. 3 is an enlarged sectional view through the plane 3—3 of the lighting panel board assembly of FIG. 2;

FIG. 4 is an enlarged sectional view taken through the plane 4—4 of the lighting panel board assembly of FIG. 2;

FIG. 5 is a sectional view through the plane 5—5 of the lighting panel board assembly of FIG. 2; and FIG. 6 is an end view in partial section through the plane 6—6 of the lighting panel board assembly of FIG. 2.

DESCRIPTION OF THE PREFERRED EMBODIMENT

The lighting panel board assembly 10 is shown in FIG. 1 with the circuit breaker support base 11 integrally formed from a thermoplastic resin and having a plurality of circuit breaker retainer hooks 12 formed therein at opposite ends of the support surface. Three insulating barriers 13 are also formed within the base for providing electrical insulation between the different phases when the lighting panel is employed within a three-phase power circuit. The base is assembled over three busses 14 which are positioned and supported by a plurality of screws 18 through a pair of molded plastic cross bars 15 at opposite ends of the busses. The center bus contains a plurality of circuit breaker blades 19 secured to the bus with screws 18 and extending upright as indicated. The circuit breaker blades 19 have a T-shaped configuration with a pair of bottom steps 20 defined under the crossarm 19A of the T. After the base 11 is supported on the busses 14, a plurality of branch straps 16 having circuit breaker contact blades 17 are inserted within a corresponding plurality of openings 22 defined within the base. The straps are secured to the outer busses by means of screws 18 and are electrically isolated by means of a pair of covers 23 extending across the straps and fastened to the base by the insertion of integrally formed tangs 24 extending from the bottom of the covers within slots 29 formed in the top surface of the base. When the covers are in place, an auxiliary insulating barrier 27 is then positioned on the base by the insertion of a pair of legs 28 depending from the bottom of the auxiliary barrier to within a corresponding pair of rail slots 26 formed within the rail 25 extending from the side of the base.

The completed panel board assembly 10 is shown in FIG. 2 with two bases 11 attached to the three busses 14 and with the cross bars 15 arranged at opposite ends of the busses as shown. The attachment between the auxiliary barrier 27 and base 11 is seen by referring to FIG. 3 wherein a pair of slots 28A within legs 28 trap a detent 31 integrally formed within the base when the legs 28 of the auxiliary barrier are inserted through the slots 26 formed within rail 25. The resiliant properties of the plastic barrier 27 allow the legs 28 to move over the detent 31 and then snappingly return to capture the barrier under the detent.

The attachment between the circuit breaker blade 19 and the bottom of base 11 is best seen by referring now to FIG. 4 wherein the bottom of the blade 19 is secured to the bus 14 and the top of the crossarm 19A has passed through the slot 38 defined between the angled top portions 33 of a pair of fingers 32 which comprise a clip integrally formed within the bottom support surface IIA of the base and extending from the vertical plane at an angle. Once the crossarm 19A has passed through slot 38 the angled top portions 33 snappingly return to their initial position and nest under the bottom step 20 formed within the blade such that the base 11 provides support to the bus 14 secured to the bottom thereof.

The attachment between the covers 23 and base 11 can be seen by referring now to FIG. 5 wherein the cover is depicted in phantom at 23A prlor to insertion. After insertion, the tangs 24 integrally formed within and extending from the bottom of the cover, pass through a pair of corresponding slots 29 formed in the base. Detents 30 formed at the ends of tangs 24 snappingly engage the bottom of the turned edges 39 formed within the base. In order to remove the cover from the base, both detents 30 must be moved out of engagement with both edges 39 of the base by the use of a screwdriver or similar tool.

In order to facilitate automated assembly of the branch straps 16, a pair of ramps 35A, 35B are formed within the vertical side walls 36A, 36B on the bottom support surface IIA of base 11. As best seen in FIG. 6, the branch strap is depicted in phantom at 16A before attachment to the support. The ramps 35A, 35B allow the sides of the branch strap 16 to be guided into position while a rib guide 34 integrally formed within the base, as best seen in FIG. 2, provides a stop for the front 37 of the branch strap when downwardly loaded within openings 22.

It is thus seen that the automated assembly of lighting panel board components can be efficiently accomplished by means of structure integrally formed within the plastic circuit breaker support base. Guiding means for rapid insertion of the branch straps along with support means for holding the busses to which the support is attached allow for the accurate attachment of the busses and straps to which the circuit breakers are later connected. Separate plastic molded covers and auxiliary barriers insure sufficient electrical isolation between the electrically conducted components within the assembled panel board interior.

What we claim as new and desire to secure by Letters Patent is as follows:

1. An improved circuit breaker mounting assembly consisting of a molded plastic support supporting main power busses, branch power straps and adapted to support molded case circuit breakers, the improvement which comprises:

access means formed within a top surface of said -molded plastic support for vertical access to said branch straps and said main busses; and molded plastic cover means adapted for snappingly engaging slots formed on said top surface proximate a side of said access means to provide electrical insulation between circuit breakers and said branch straps.

2. The improved circuit breaker mounting assembly of claim 1 wherein said access means comprise three parallel and coextensive openings arranged linearly along a major length of said top surface, said branch straps being arranged within said openings.

3. The improved circuit breaker mounting assembly of claim 2 wherein said openings are defined by a pair of opposing parallel side walls and a pair of end walls extending vertically from said top surface, said side walls having integrally formed guide ramps extending inboard of said openings.

4. The improved circuit breaker mounting assembly of claim 3 wherein said guide ramps slope inwardly within said openings to allow sides of said branch straps to guide along said ramps when inserted within said openings for mounting on said main busses.

5. The improved circuit breaker mounting assembly of claim 3 wherein said end walls have an integrally formed rib guide within said openings to provide a stop for a front surface of said branch straps inserted within said openings.

6. The improved circuit breaker mounting assembly of claim 3 wherein a bottom support contains a support clip comprising a pair of fingers integrally formed therein and extending upwards within said openings for slidingly engaging a circuit breaker connector blade carried by said main power busses.

7. The improved circuit breaker mounting assembly of claim 6 wherein said circuit breaker connector blade comprise a planar metal plate extending upwards within said openings and retained between said pair of fingers.

8. The improved circuit breaker mounting assembly of claim 7 wherein said planar metal plate comprises a T-shaped configuration and wherein top surfaces of said fingers rest under a step on said T on both sides of said plate to provide further support to said circuit breaker connector blade and said main busses.

9. The improved circuit breaker mounting assembly of claim 1 wherein said plastic cover comprises a rectangular member having a pair of integrally formed tangs extending therefrom for inserting within said slots formed on said top surface of said plastic support.

10. The improved circuit breaker mounting assembly of claim 3 including:

a rail member integrally formed on said side walls outboard of said openings and having means defining a pair of rails slots extending through a bottom of said rail member; and an insulative barrier having a pair of downwardly extending legs integrally formed therein for inserting within said slots for removably retaining said barrier.

* * * * *